(12) United States Patent
Martin et al.

(10) Patent No.: US 10,024,416 B2
(45) Date of Patent: Jul. 17, 2018

(54) TRANSFER CASE WITH PASS-THROUGH POWER TAKEOFF FOR FOUR WHEEL DRIVE VEHICLES

(71) Applicant: Marco Equipment Sales, LLC, Honey Brook, PA (US)

(72) Inventors: Duane Martin, New Holland, PA (US); Anthony M. Hostetter, Mohnton, PA (US)

(73) Assignee: Marco Equipment Sales, LLC, Honey Brook, PA (US)

( * ) Notice: Subject to any disclaimer, the term of this patent is extended or adjusted under 35 U.S.C. 154(b) by 196 days.

(21) Appl. No.: 15/196,270

(22) Filed: Jun. 29, 2016

(65) Prior Publication Data

US 2016/0305531 A1    Oct. 20, 2016

Related U.S. Application Data

(63) Continuation-in-part of application No. 13/398,055, filed on Feb. 16, 2012.

(51) Int. Cl.
*F16H 57/021* (2012.01)
*F16H 57/035* (2012.01)
(Continued)

(52) U.S. Cl.
CPC ............ *F16H 57/021* (2013.01); *B60K 17/28* (2013.01); *B60K 17/344* (2013.01); *B60K 25/06* (2013.01);
(Continued)

(58) Field of Classification Search
CPC ...... B60K 25/06; B60K 17/28; B60K 17/344; F16H 57/021; F16H 57/023;
(Continued)

(56) References Cited

U.S. PATENT DOCUMENTS

| 2,232,992 | A | * | 2/1941 | Alexander | B60K 17/28 |
| | | | | | 180/53.1 |
| 3,338,114 | A | * | 8/1967 | Jacobson | B60K 25/06 |
| | | | | | 192/48.9 |

(Continued)

FOREIGN PATENT DOCUMENTS

JP    02120131 A  *  5/1990
JP    04183638 A  *  6/1992

*Primary Examiner* — Laura Freedman
(74) *Attorney, Agent, or Firm* — Miller Law Group, PLLC

(57) ABSTRACT

A transfer case for use with four-wheel drive vehicles incorporates a pass-through power takeoff shaft to drive remote secondary implements or accessory devices. The power takeoff shaft delivers rotational power from the vehicle transmission to the remote implement or accessory by passing through the housing of the transfer case to improve ground clearance and minimize driveline angles. The housing for the transfer case can mount bearings that rotatably support the power takeoff shaft. Alternatively, a tubular member can be mounted in the transfer case to provide a passageway through which the power takeoff shaft can pass through the transfer case. The points of engagement of the power takeoff shaft and the transfer case housing are sealed to prevent the loss of lubricating fluid from the transfer case. In each embodiment, the power takeoff shaft passes through the transfer case without engagement of or interference with the drive components therein.

16 Claims, 12 Drawing Sheets

(51) Int. Cl.
*F16H 57/029* (2012.01)
*F16H 57/023* (2012.01)
*B60K 17/28* (2006.01)
*B60K 17/344* (2006.01)
*B60K 25/06* (2006.01)
*F16H 57/02* (2012.01)

(52) U.S. Cl.
CPC ......... *F16H 57/023* (2013.01); *F16H 57/029* (2013.01); *F16H 57/035* (2013.01); *F16H 2057/0206* (2013.01); *F16H 2057/02026* (2013.01); *F16H 2057/02052* (2013.01)

(58) Field of Classification Search
CPC ................. F16H 57/029; F16H 57/035; F16H 2057/02026; F16H 2057/02052; F16H 2057/0206
See application file for complete search history.

(56) References Cited

U.S. PATENT DOCUMENTS

| | | | | |
|---|---|---|---|---|
| 4,542,801 A * | 9/1985 | Richards | ................ | B60K 17/28 180/235 |
| 4,579,183 A * | 4/1986 | Irikura | ................ | B60K 17/105 180/307 |
| 6,237,708 B1 * | 5/2001 | Kawada | ................ | B60K 17/28 180/53.7 |
| 6,830,142 B2 * | 12/2004 | Weilant | ................ | B60K 17/02 180/247 |
| 2012/0160057 A1 * | 6/2012 | Couto | ................ | F16H 7/06 74/665 F |
| 2013/0213157 A1 * | 8/2013 | Martin | ................ | B60K 17/28 74/15.82 |

* cited by examiner

TRANSFER CASE WITH PASS-THROUGH POWER TAKEOFF FOR FOUR WHEEL DRIVE VEHICLES

CROSS-REFERENCE TO RELATED APPLICATIONS

This application is a continuation in part of U.S. patent application Ser. No. 13/398,055, filed on Feb. 16, 2012, now abandoned, the content of which is incorporated herein by reference.

FIELD OF THE INVENTION

The present invention relates generally to a transfer case for a four wheel drive vehicle, and more particularly, to a transfer case having a power takeoff shaft extending through the transfer case without operatively engaging the drive components within the transfer case.

BACKGROUND OF THE INVENTION

A transfer case is a part of a drive system for four wheel drive and all-wheel drive vehicles. The transfer case houses drive components that connect to the primary drive mechanism of the vehicle and transfers operative power to the front drive axle via a drive shaft associated with the drive components within the transfer case. Operative power is generally transferred from the primary drive mechanism to the drive components within the transfer case using a set of gears or a chain drive mechanism.

On some vehicles, including particularly commercial trucks and tractors, a power takeoff mechanism (PTO) is provided to transfer engine power to another piece of equipment or an accessory device carried by the vehicle. Typically, the power takeoff mechanism transfers engine power from the transmission to a secondary implement or accessory device by a power takeoff shaft. The power takeoff mechanism is operable independently of the transfer of engine power through the transfer case. Typically, manual drive transmissions have provisions for connecting the power takeoff mechanism lower on the transmission, in which case the power takeoff shaft is more easily able to pass below the transfer case to deliver engine power to the remote secondary or accessory device. Customarily, automatic transmissions provide operative connection of the power takeoff mechanism to the side of the transmission. As a result, power takeoff shafts are usually provided with universal joints to enable the power takeoff shaft to circumvent the transfer case to deliver operative power to the secondary implement or accessory device located behind the transfer case, as is depicted in FIG. 2 in broken lines.

The routing of the power takeoff shaft below the transfer case creates clearance problems, as the power takeoff mechanism often become the lowest part of the drive mechanism. Furthermore, maintaining acceptable driveline angles within the universal joints can be problematic, as designing a power takeoff mechanism that will maximize ground clearance while minimizing the number of universal joints and the driveline angles required of the universal joints can prove to be difficult.

It would be desirable to provide a drive mechanism for a four wheel drive vehicle utilizing a transfer case that would allow for providing a power takeoff mechanism that would maximize ground clearance while minimizing problems with universal joints in the power takeoff shaft.

SUMMARY OF THE INVENTION

It is an object of this invention to overcome the disadvantages of the prior art by providing a transfer case that has a pass-through power takeoff shaft.

It is another object of this invention to provide a transfer case for use with a four wheel drive vehicle that allows the power takeoff shaft to pass through the transfer case without interfering with the drive components within the transfer case.

It is a feature of this invention that the power takeoff shaft can pass through the housing of the transfer case to connect with a secondary implement or an accessory device located behind the transfer case.

It is an advantage of this invention that the positioning of the power takeoff shaft does not define the minimum ground clearance for the vehicle.

It is another feature of this invention that the power takeoff shaft passes through the transfer case housing without engaging or interfering with the drive components within the transfer case.

It is another advantage of this invention that the positioning of the power takeoff shaft through the transfer case minimizes the number of universal joints required for operation of the power takeoff mechanism.

It is still another advantage of this invention that the positioning of the power takeoff shaft through the transfer case minimizes the driveline angles for the universal joints incorporated into the power takeoff shaft.

It is still another feature of this invention that the power takeoff shaft can incorporate a tubular member defining a passageway through the housing of the transfer case to provide an isolated passageway for the pass-through power takeoff shaft.

It is yet another feature of this invention that the entrance and exit of the power takeoff shaft through the housing of the transfer case is sealed to prevent the loss of lubricating fluid for the drive components within the transfer case.

It is yet another advantage of this invention that the passage of the power takeoff shaft through the transfer case does not disrupt the operation of the drive components within the transfer case.

It is a further feature of this invention that the housing of the transfer case can be utilized to support a bearing or bearings for rotatably supporting the power takeoff shaft.

It is still another object of this invention to provide a transfer case accommodating a pass through power takeoff shaft which is durable in construction, inexpensive of manufacture, carefree of maintenance, facile in assemblage, and simple and effective in use.

These and other objects, features and advantages are accomplished according to the instant invention by providing a transfer case for use with four-wheel drive vehicles that incorporates a pass-through power takeoff shaft to drive remote secondary implements or accessory devices. The power takeoff shaft delivers rotational power from the vehicle transmission to the remote implement or accessory by passing through the housing of the transfer case to improve ground clearance and minimize driveline angles. The housing for the transfer case can mount bearings that rotatably support the power takeoff shaft. Alternatively, a tubular member can be mounted in the transfer case to provide a passageway through which the power takeoff shaft can pass through the transfer case. The points of engagement of the power takeoff shaft and the transfer case housing are sealed to prevent the loss of lubricating fluid from the transfer case. In each embodiment, the power takeoff shaft passes through the transfer case without engagement of or interference with the drive components therein.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENT

Figure 1:
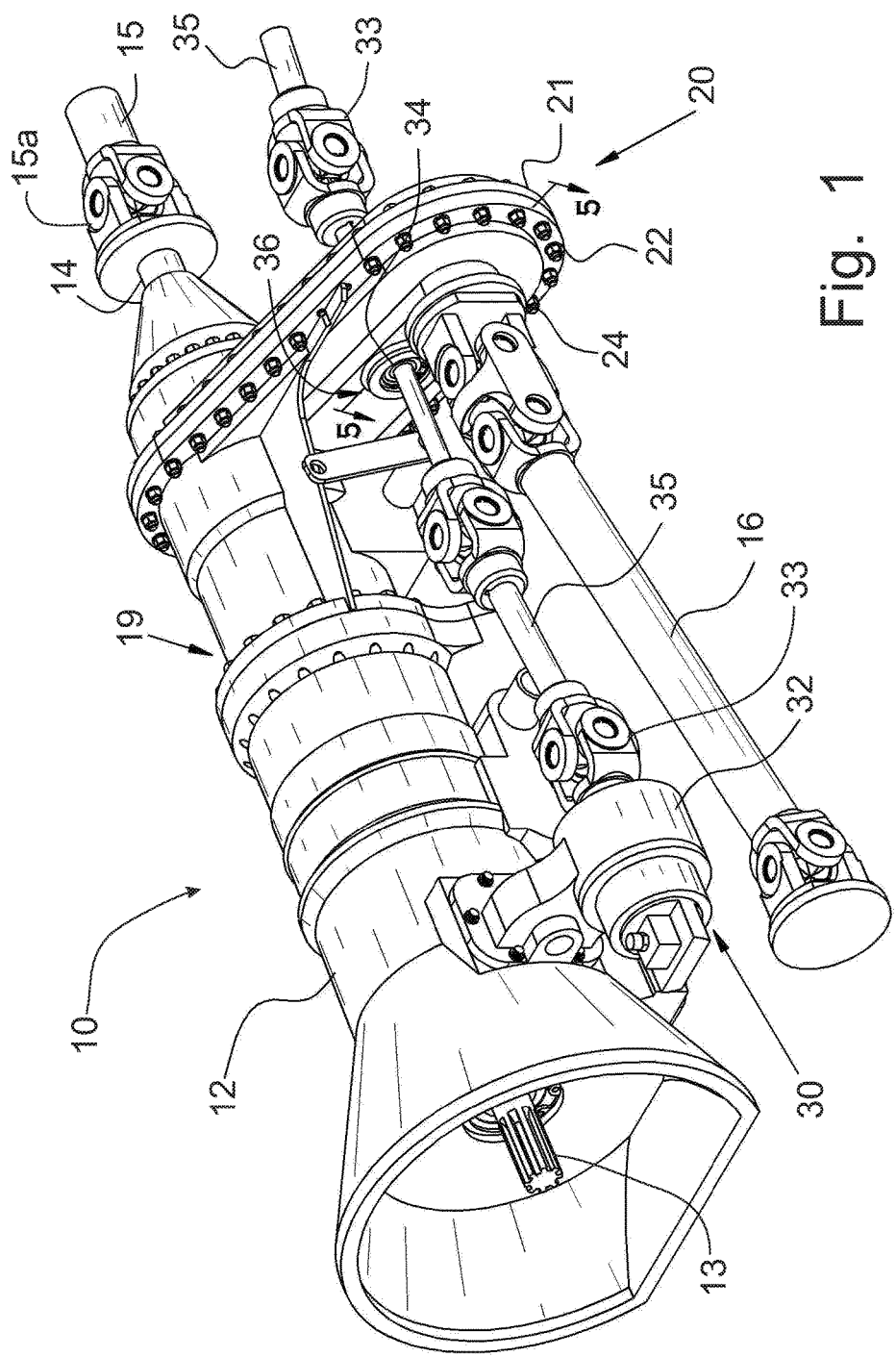
FIG. 1 is a perspective view of a portion of the drive mechanism for a four wheel drive vehicle utilizing a transfer case coupled to the primary drive mechanism and having a power takeoff mechanism incorporating the principles of the instant invention.
Figure 2:
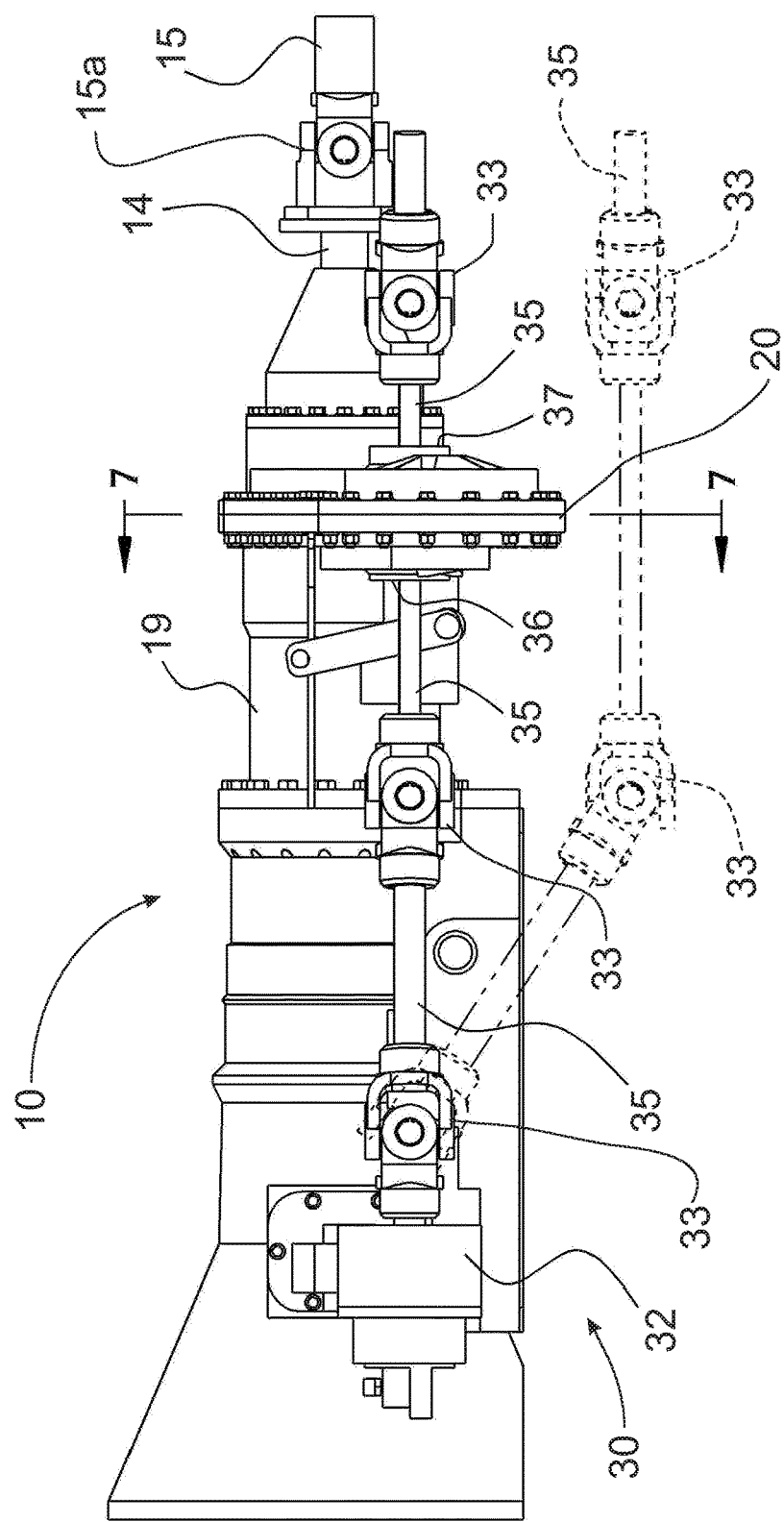
FIG. 2 is a side view of the primary drive mechanism as shown in FIG. 1, but with the front axle drive shaft being removed for purposes of clarity, and having a transfer case incorporating the principles of the instant invention, the prior art positioning of the power takeoff shaft being shown in broken lines passing below the transfer case.
Figure 13:
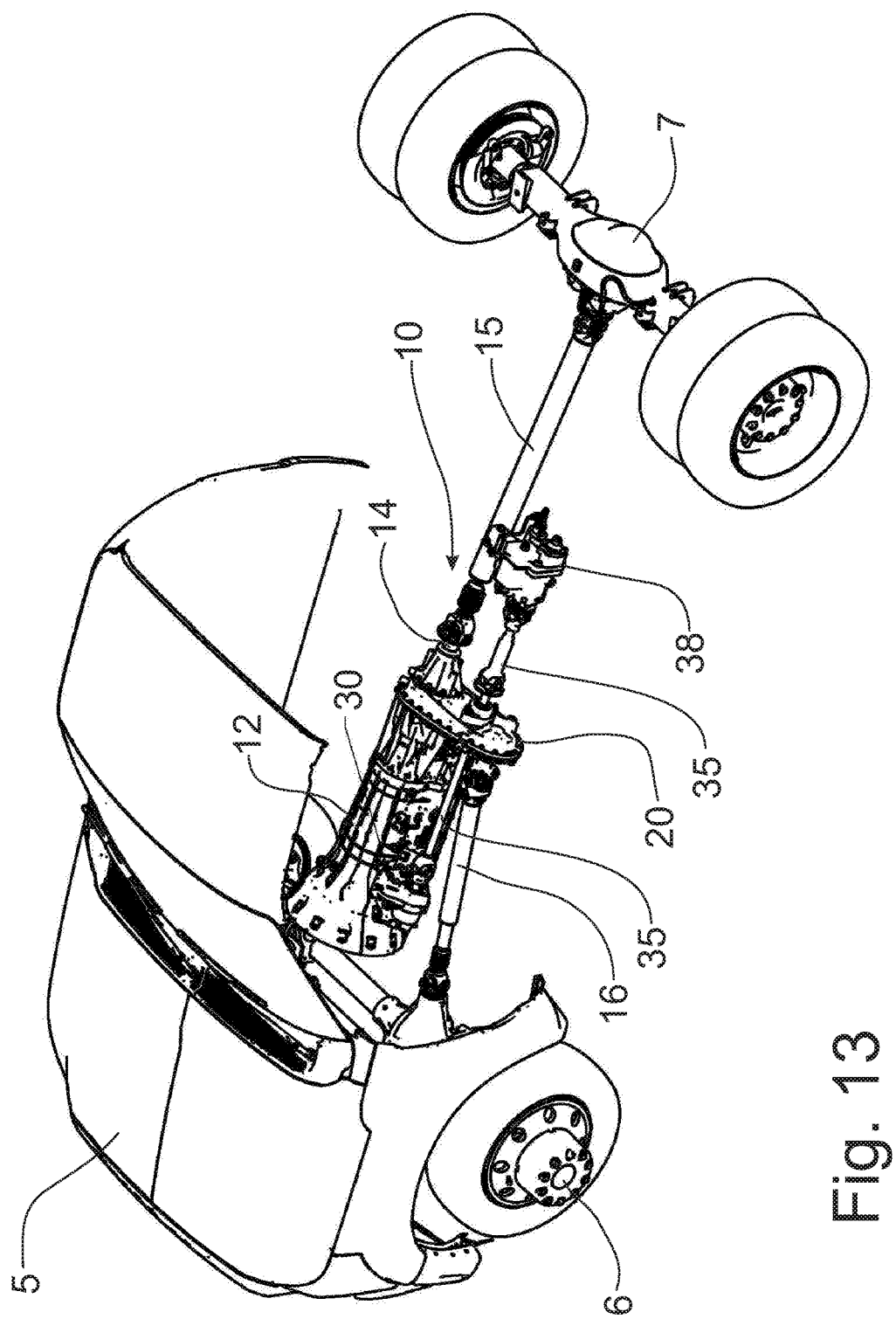
FIG. 13 is a schematic perspective view of a four wheel drive vehicle having the drive mechanism incorporating the principles of the instant invention installed therein to drive the front and rear axles of the vehicle.

Referring to FIGS. 1, 2 and 13, a significant portion of the primary drive line 10 for a four wheel drive vehicle can best be seen. The vehicle 5 has a front axle 6 and a rear axle 7 which are both driven through the primary drive line 10, as will be described in greater detail below. The vehicle 5 has a conventional motor (not shown) that provides a source of rotational power that is delivered to the transmission 12 by connection to the power input shaft 13 for the transmission 12. As one skilled in the art will recognize, the transmission 12 is operable to vary the speed of rotation of the transmission output shaft 14 with respect to the speed of operation of the transmission input shaft 13. The output shaft (not shown) of the motor, which is connected to the transmission 12 through the power input shaft 13, through the transmission output shaft 14 which is conventionally connected to the rear axle drive shaft 15 is defined as the primary or main drive line 10.

The rear axle 7 of the vehicle 5 is driven directly from the transmission output shaft 14, which becomes the rear axle drive shaft 15 via connection through a universal joint 15a. The front axle 6 of the vehicle 5 is driven through a power transfer mechanism 25 associated with a transfer case 20, as will be described in greater detail below, to transfer rotational power to a front axle drive shaft 16 which ultimately connects to the front axle 6 typically through a clutch (not shown) that permits selective operative engagement of the front axle drive shaft 16 with the front axle 6. Many four wheel drive vehicles 5, particularly commercial trucks and tractors, are also provided with a power takeoff mechanism 30 that is operable, as will also be described in greater detail below, to provide a source of operative power for a secondary implement or accessory device (not shown) that is associated with the vehicle 5. This invention is directed to providing a drive system for a four wheel drive vehicle that delivers rotational power to both the front and rear axles 6, 7 of the vehicle 5 while providing a unique arrangement for the support of a power takeoff mechanism 30.

Figure 3:
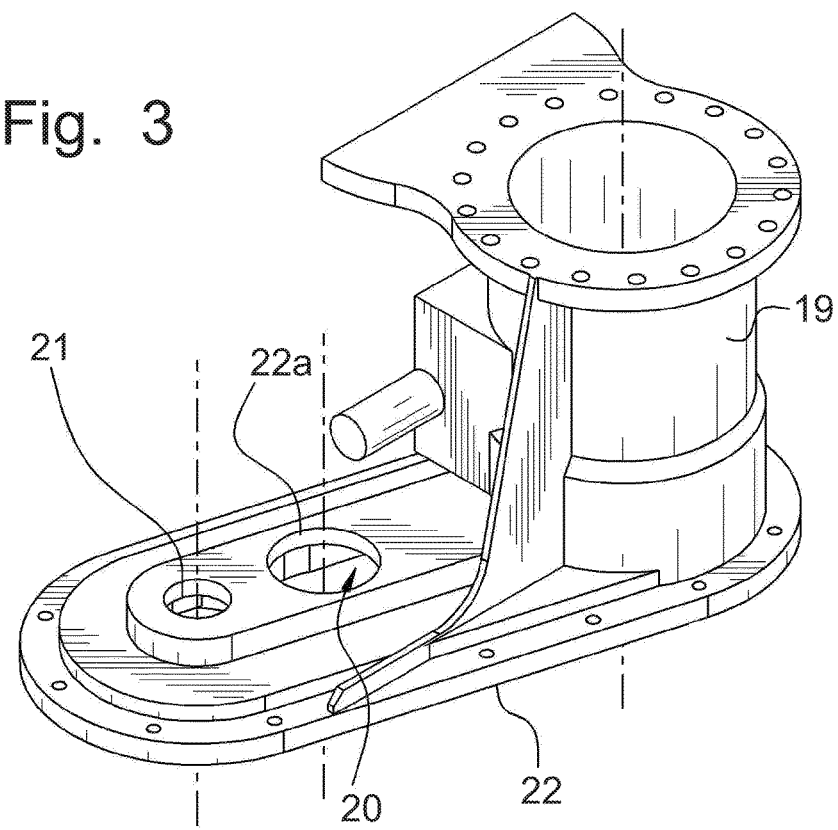
FIG. 3 is a perspective view of a front housing member of the transfer case.
Figure 4:
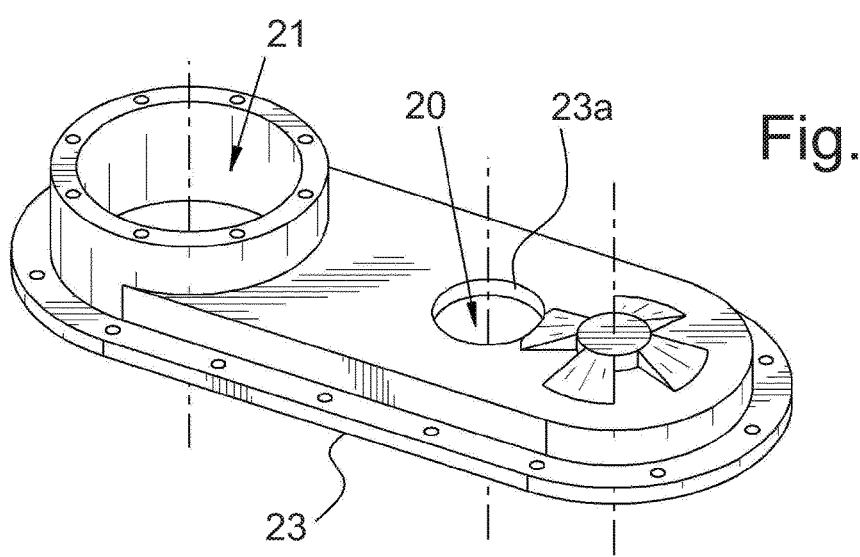
FIG. 4 is a perspective view of a rear housing member of the transfer case.
Figure 5:
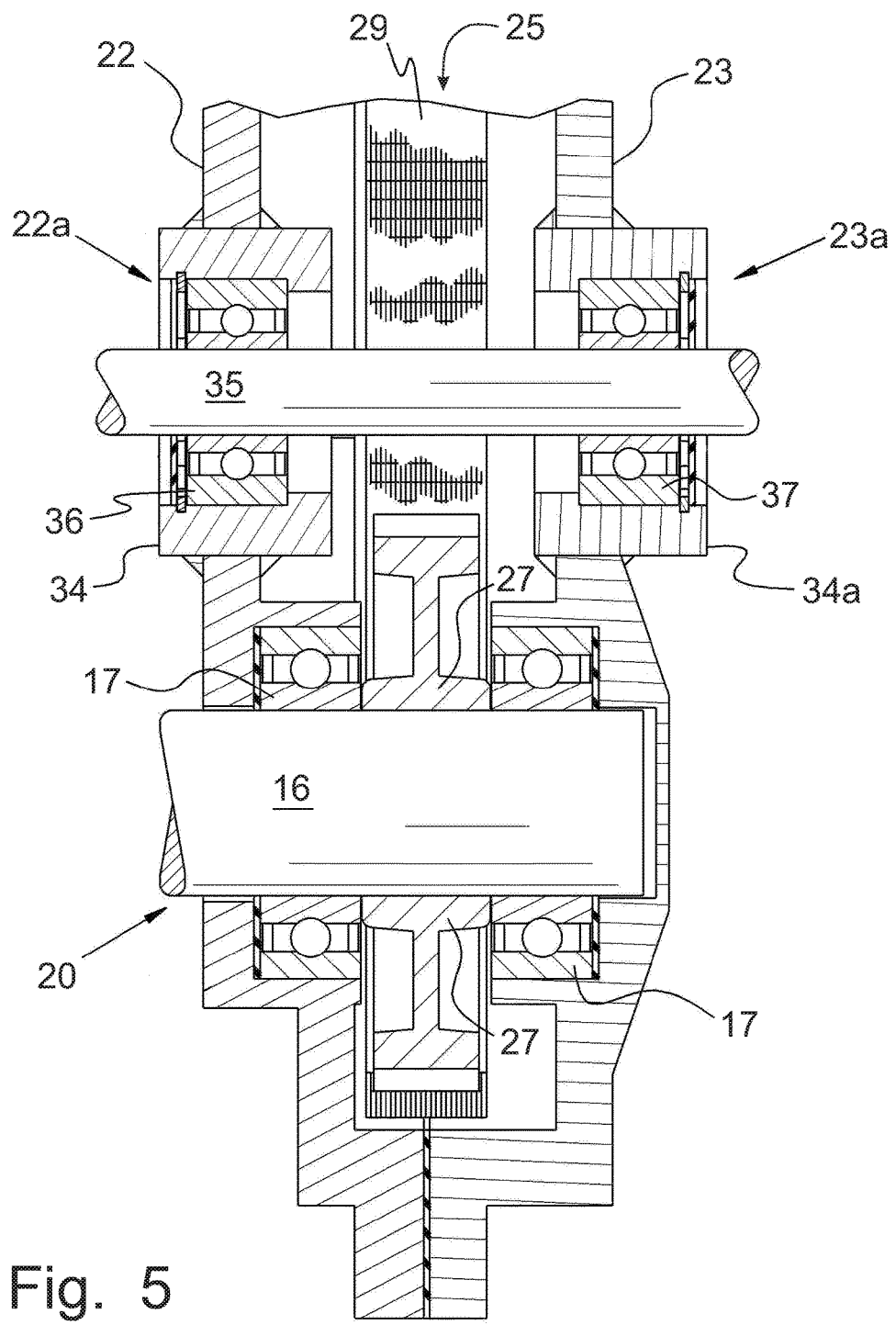
FIG. 5 is a cross-sectional view taking along lines 5-5 of FIG. 1 to show a portion of the transfer case as depicted in FIG. 1 and a first embodiment of the mounting of the power takeoff shaft passing through the transfer case.
Figure 6:
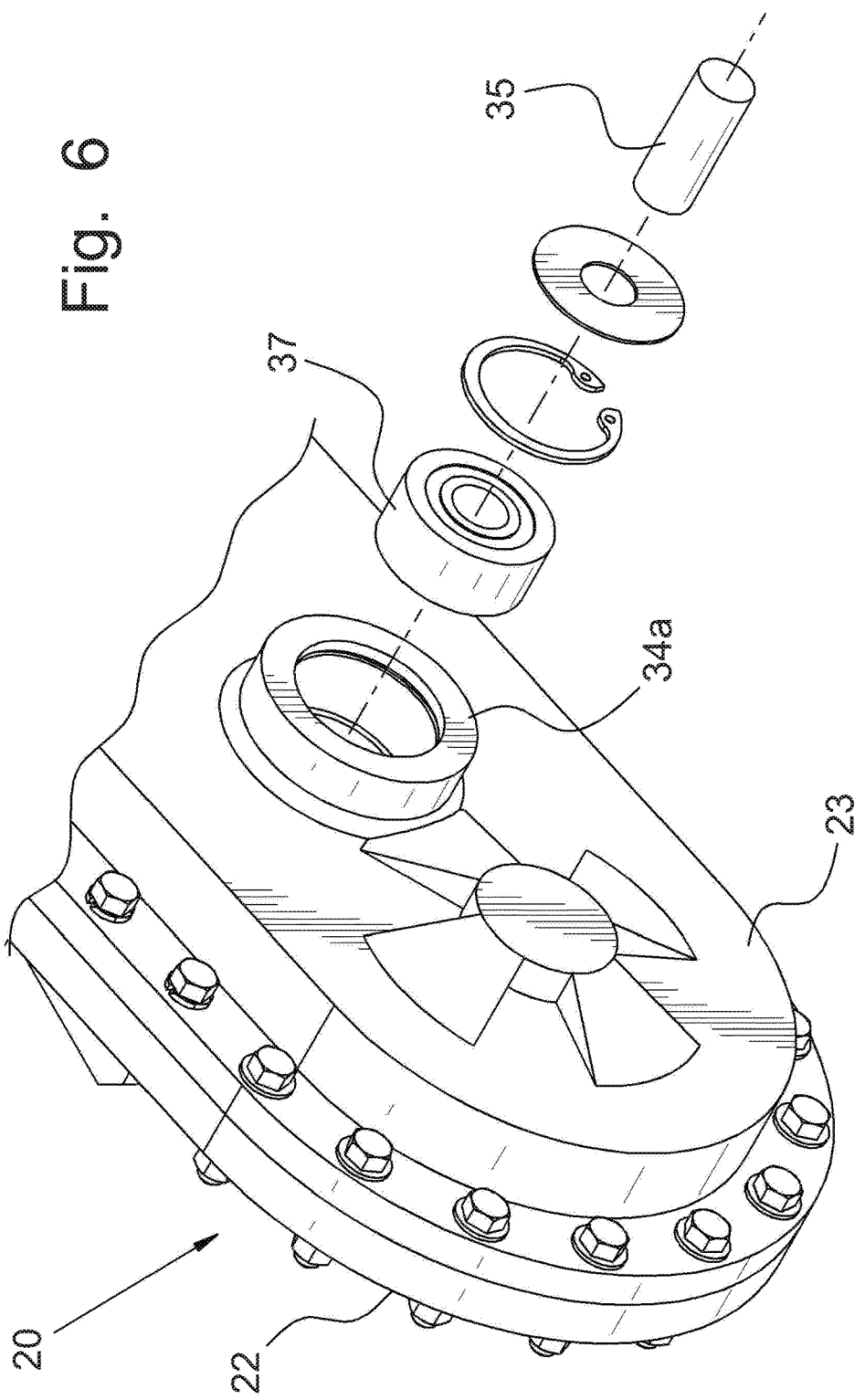
FIG. 6 is an exploded rear perspective view of a rear portion of the transfer case showing a rear bearing assembly mounted on the transfer case housing for rotatably supporting the power takeoff shaft passing therethrough.

The transfer case 20 is best seen in FIGS. 1-8. The transfer case 20 includes a housing 21 that is generally oval in shape and is oriented perpendicularly to the drive line 10 rearwardly of the transmission 12. The housing 21 is preferably manufactured from formed sheet metal or castings into mating front and rear housing members 22, 23 that are joined together by a plurality of fasteners 24 spaced around the periphery of the housing 21 with a seal (not shown) therebetween to form a fluid tight hollow housing 21 that retains lubricating fluid for the power transfer mechanism 25 housed within the housing 21. As best seen in FIGS. 3 and 4, the housing 21 is formed to include a housing extension 19 that connected to the transmission 12 to become part of the drive line 10.

Figure 7:
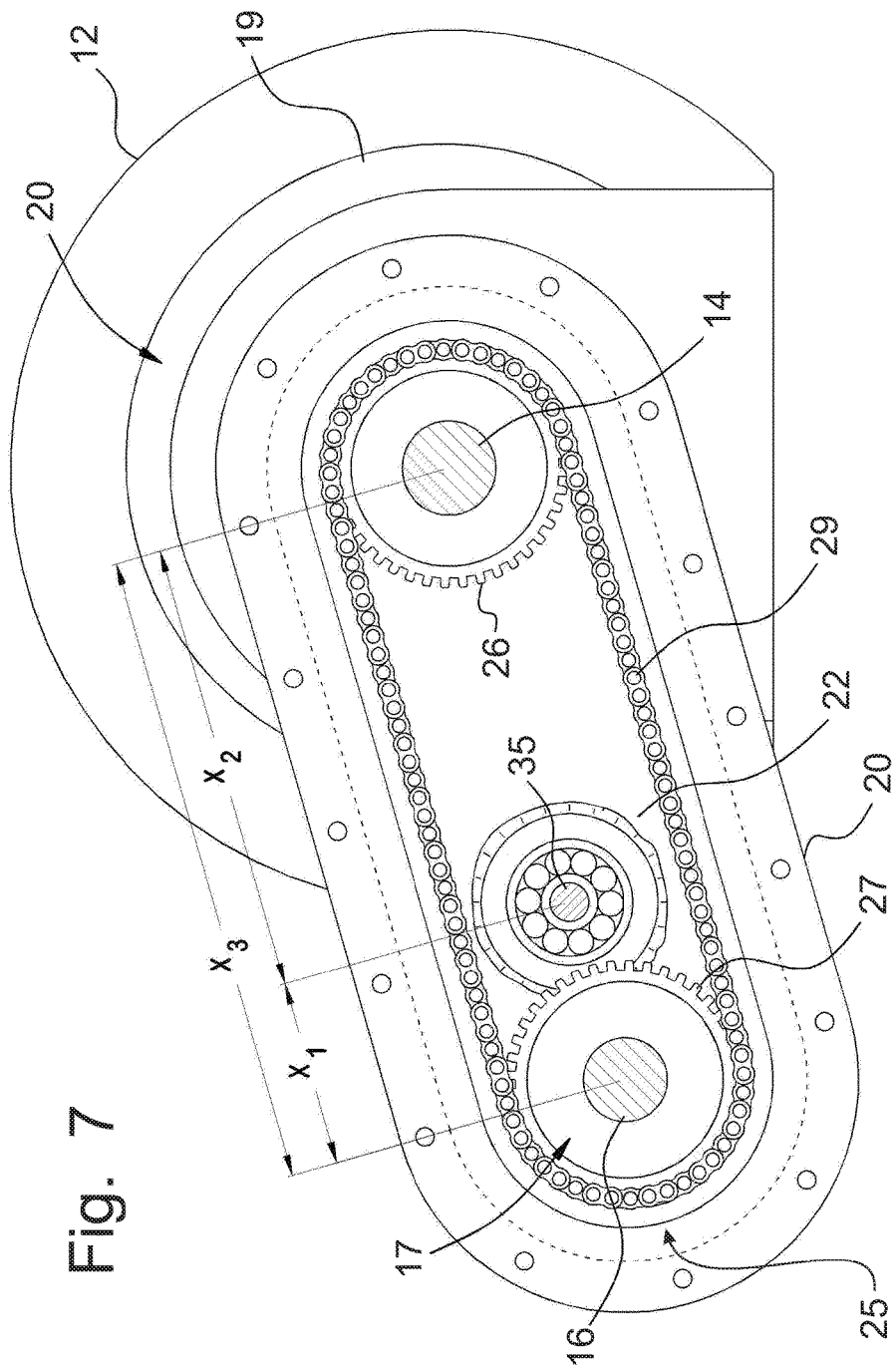
FIG. 7 is a cross-sectional view of the transfer case taken along lines 7-7 of FIG. 2 to show the passage of the power takeoff shaft without engagement or interference with the drive components within the transfer case.

The power transfer mechanism 25 within the transfer case 20 is best seen in FIG. 7 and includes a drive sprocket 26 mounted on the transmission output shaft 14 to be rotatable therewith. The front axle drive shaft 16 is rotatably supported by bearings 17 mounted internally of the housing 21 at the distal end of the transfer case 20 from the transmission output shaft 14 and has a driven sprocket 27 mounted thereon to be rotatable therewith. An endless chain coupler 29 is entrained around the drive sprocket 26 and the driven sprocket 27 to transfer rotational power from the transmission output shaft 14 to the front axle drive shaft 16. One skilled in the art will recognize that the power transfer mechanism 25, including the sprockets 26, 27 and the chain coupler 29, is the preferred embodiment of the power transfer mechanism 25, but is not the only embodiment that would be operable to transfer rotational power to the front axle. For example, a series of intermeshing gears (not shown) could interconnect the transmission output shaft 14 and the front axle drive shaft 16 to transfer rotational power. A belt drive arrangement (not shown) would also be an operable embodiment.

The power takeoff mechanism 30 is operatively coupled to the front portion of the transmission to be engaged with the transmission input shaft 13 so as to receive rotational power from the engine or motor (not shown) without modification induced by the operation of the transmission 12. One of ordinary skill in the art will recognize that the power takeoff mechanism (also known as the PTO) 30 receives rotational power from the input shaft 13 through a drive transfer mechanism 32 that causes the power takeoff shaft 35 to rotate. As shown in broken lines in FIG. 2, the power takeoff shaft (also known as the PTO shaft) 35 conventionally included multiple universal joints 33 that enabled the PTO shaft 35 to bend from the drive transfer mechanism 32 to pass below the transfer case 20 in order to reach a position behind the transfer case to power a secondary implement or accessory device (not shown).

According to the principles of the instant invention, instead of the PTO shaft 35 passing below the transfer case 20, the transfer case 20 is adapted to receive the PTO shaft 35 and allow the PTO shaft 35 to pass through the transfer case 20 without engagement with or interference with the power transfer mechanism 25 housed within the housing 21. Since the transfer case 20 needs to be a fluid-tight structure to keep the power transfer mechanism 25 therein lubricated, the entrance and exit of the PTO shaft 35 through the housing 21 of the transfer case 20 will require sealing as well as proper placement so as to not interfere with the operation of the power transfer mechanism 25.

Referring now to FIGS. 1-7 and 13, the structure of the power takeoff mechanism 30 passing through the transfer case 20 can best be seen. Rather than pass below the transfer case 20, as is shown in broken lines in FIG. 2, the power takeoff shaft 35 is aligned with the transfer case 20. A first PTO opening 22a is formed in the front housing member 22 of the housing 21, while a second PTO opening 23a is formed in the rear housing member 23 of the housing 21 in alignment with the first PTO opening 22a to allow for the passage of the PTO shaft 35 through the transfer case 20. To rotatably support the PTO shaft 35 through the transfer case 20, a bearing 36 is supported in the first PTO opening 22a by a collar 34 welded and sealed to the front housing member 22 of the housing 21 to maintain the transfer case 20 as a fluid tight structure. Similarly, a second bearing 37 is mounted at the second PTO opening 23a by a rear collar 34a welded and sealed with the rear housing member 23 of the housing 21. With the PTO shaft 35 mounted for rotation by the bearings 36, 37, the PTO shaft 35 is free to operate while the transfer case 20 is maintained as a fluid tight structure.

As is best seen in FIG. 7, the selection of the location for the PTO openings 22a, 23a, is such as to allow the PTO shaft 35 to pass through the void in the power transfer mechanism 25 between the sprockets 26, 27 and between the upper and lower runs of the chain coupler 29. Furthermore, the location of the PTO openings 22a, 23a is generally aligned with the drive transfer mechanism 32 so as to present a substantially linear path for the positioning of the PTO shaft 35. As best seen in FIG. 7, the preferably configuration for the location of the PTO shaft through the transfer case 20 is closer to the front axle drive shaft 16 than the primary drive line 10 such that with the distance from the transmission output shaft 14 to the front axle drive shaft 16 being $x_3$, the distance $x_1$ from the front axle drive shaft 16 to the PTO shaft 35 is smaller than the distance $x_2$ from the PTO shaft 35 to the transmission output shaft 14. In such a linear configuration, the PTO shaft 35 could potentially utilize fewer universal joints 33. Furthermore, one skilled in the art will recognize that the PTO shaft 35 between the two bearings 36, 37 is exposed to lubrication from the lubricating fluid (not shown) placed internally of the transfer case 20 to lubricate the power transfer mechanism 25; however, such exposure is not detrimental to the operation of the power takeoff mechanism 30, nor detrimental to the operation of the power transfer mechanism 25.

Figure 8:
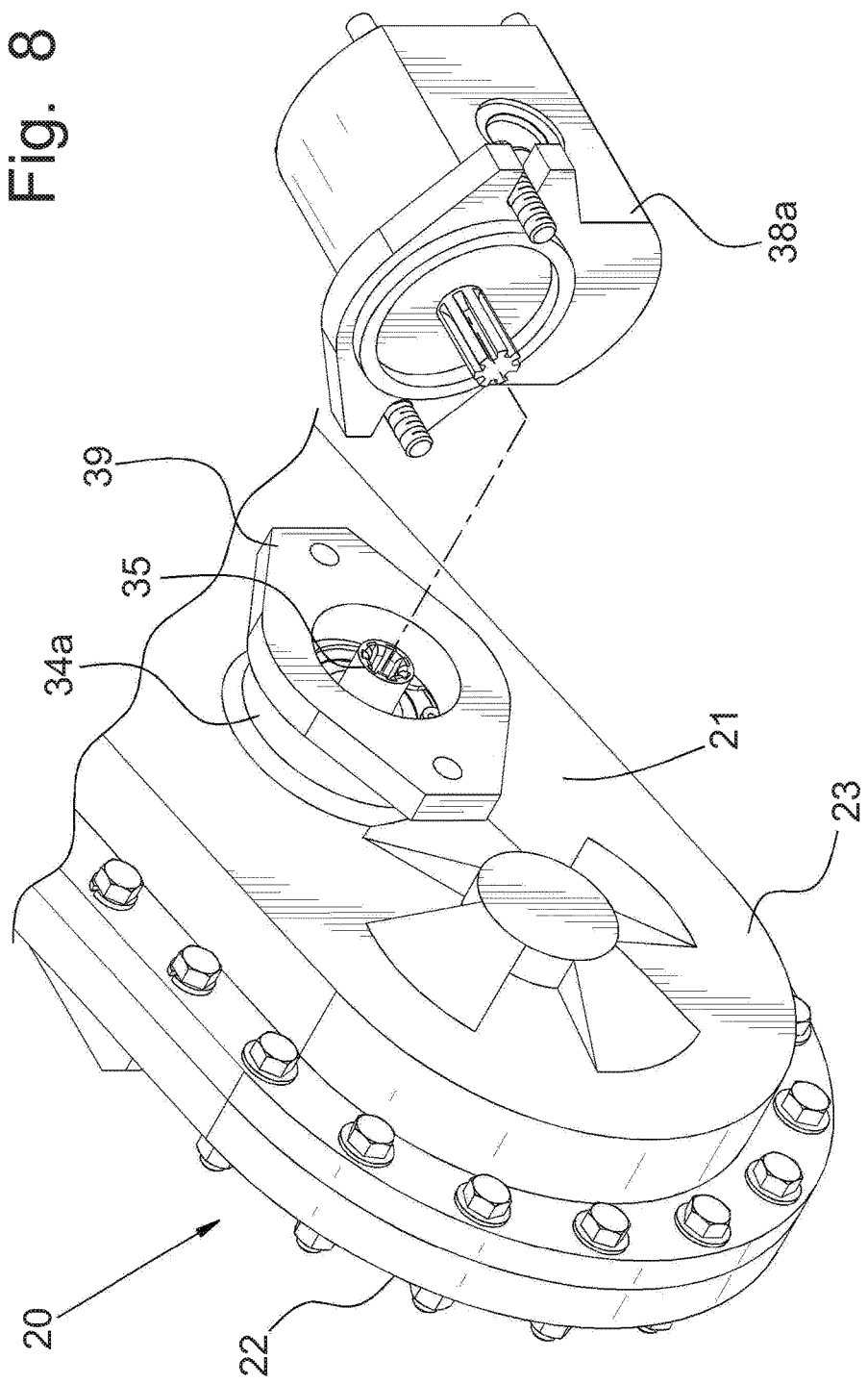
FIG. 8 is a rear perspective view of the transfer case showing an adapter for mounting a secondary implement or accessory directly to the transfer case while being powered by the power takeoff shaft passing through the transfer case.

As is depicted in FIGS. 1, 2 and 13, the PTO shaft 35 can extend rearwardly of the transfer case 20 to power the operation of a secondary device or accessory 38 positioned remotely from the transfer case 20. Such extension of the PTO shaft 35 will typically require the utilization of at least one universal joint 33. On the other hand, some configurations of the secondary device or accessory, such as a hydraulic pump 38a as depicted in FIG. 8, can be mounted directed to the rear housing member 23 of the housing 21 through a mounting bracket 39 that is affixed, such as by welding, to the rear collar 34a secured to the housing 21 and configured to mate with the device 38a mounted thereto. In such a configuration, the distal end of the PTO shaft 35 is configured to mate with the input shaft of the device 38a in order to transfer rotational power thereto. Accordingly, a hydraulic pump 38a can be mounted on the rear housing member 23 of the housing 21 and be driven directly by the PTO shaft 35. The operation of the hydraulic pump 38a can drive the operation of a number of remote hydraulic devices (not shown).

Figure 9:
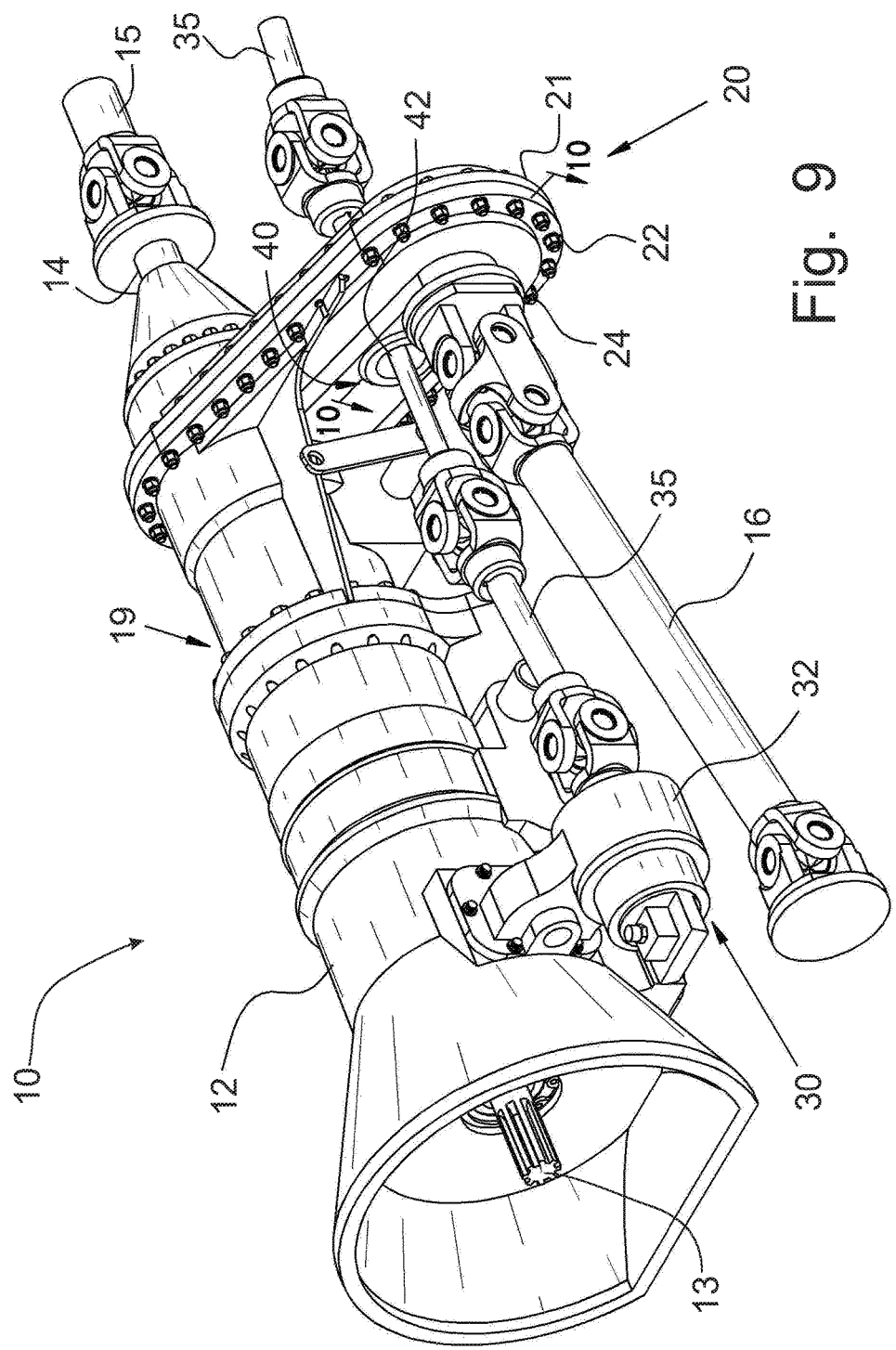
FIG. 9 is a perspective view of another embodiment of the transfer case accommodating the passage of the power takeoff shaft according to the principles of the instant invention.
Figure 10:
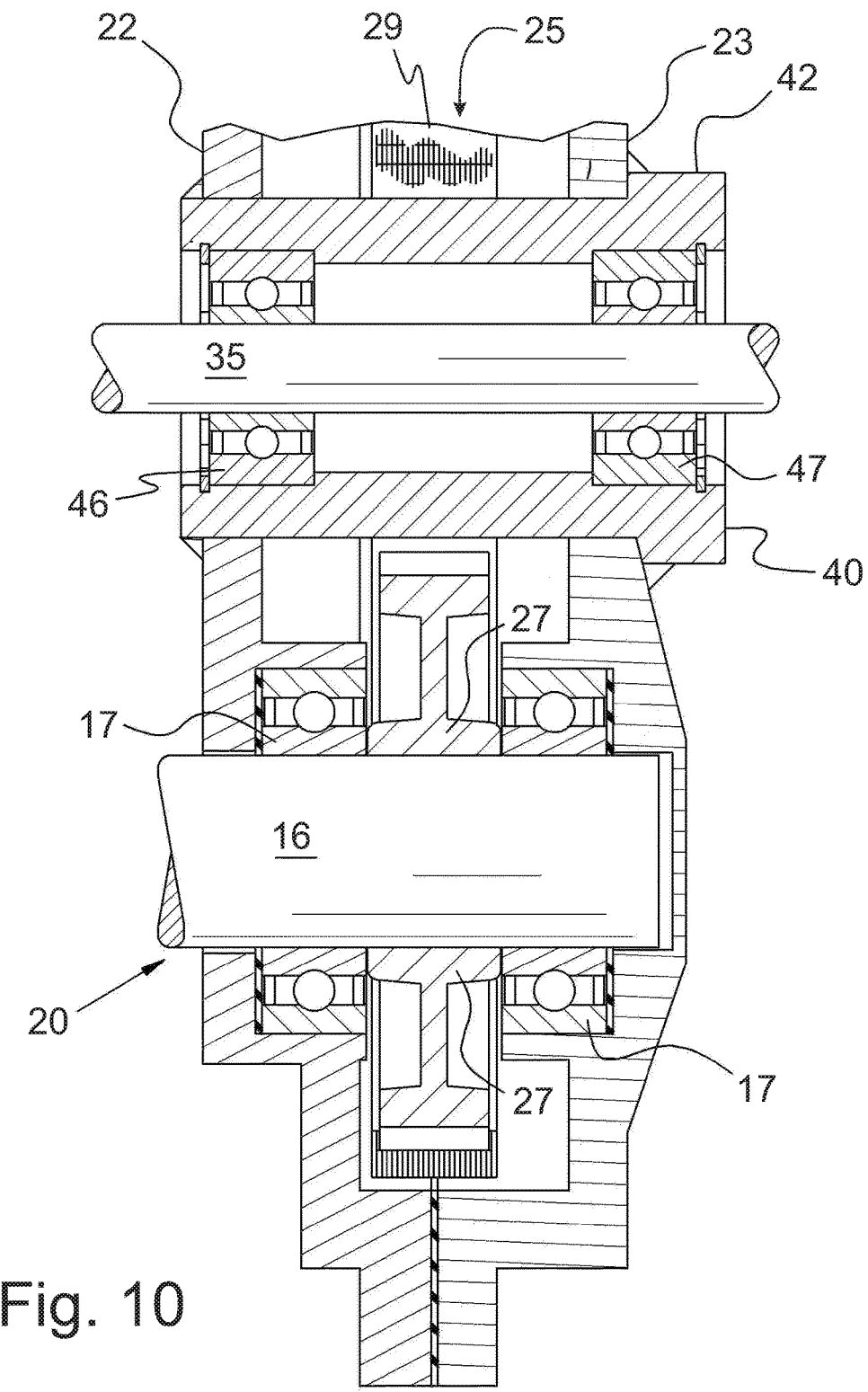
FIG. 10 is a cross-sectional view of a portion of the transfer case taken along lines 10-10 in FIG. 9 to depict the mounting of the tubular member and the passage of the power takeoff shaft therethrough without engagement or interference with the drive components within the transfer case.

An alternative structural configuration for passing the PTO shaft 35 through the interior of the transfer case 20 can be seen in FIGS. 9 and 10. Rather than have a pair of bearings 36, 36 mounted on the housing 21 to rotatably support the operation of the PTO shaft 35, the transfer case 20 can be provided with a receiving tube 40 passing through the front and rear PTO openings 22a, 23a and being formed with at least one external circular flange 42 to facilitate affixing, such as by welding, the receiving tube 40 to the front and rear housing members 22, 23 of the transfer case housing 21. With the receiving tube 40 sealed to the housing 21, such as by the welding of the receiving tube 40 to the housing 21, the transfer case 20 remains fluid tight and is thus formed with a passageway extending through the transfer case 20.

The PTO shaft 35 can then be passed through the transfer case 20 by being positioned through the passageway defined by the receiving tube 40. Preferably, bearings 46, 47 are mounted in the opposing front and rear ends of the receiving tube 40 to rotatably support the operation of the PTO shaft 35. The bearings 46, 47 in the receiving tube 40 do not require sealing to maintain the fluid tight integrity of the transfer case 20, as the receiving tube 40 seals the openings 22a, 23a. In this configuration, the central, exterior portion of the receiving tube 40 is exposed to the lubrication within the transfer case 20, rather than the PTO shaft 35 itself. The mounting of the bearings in the receiving tube 40 has the advantage of being easier to replace in the event of bearing failure, as the bearings 46, 47 in the receiving tube 40 would not require re-sealing as the bearings 36, 37 would require with respect to the housing 21.

Figure 11:
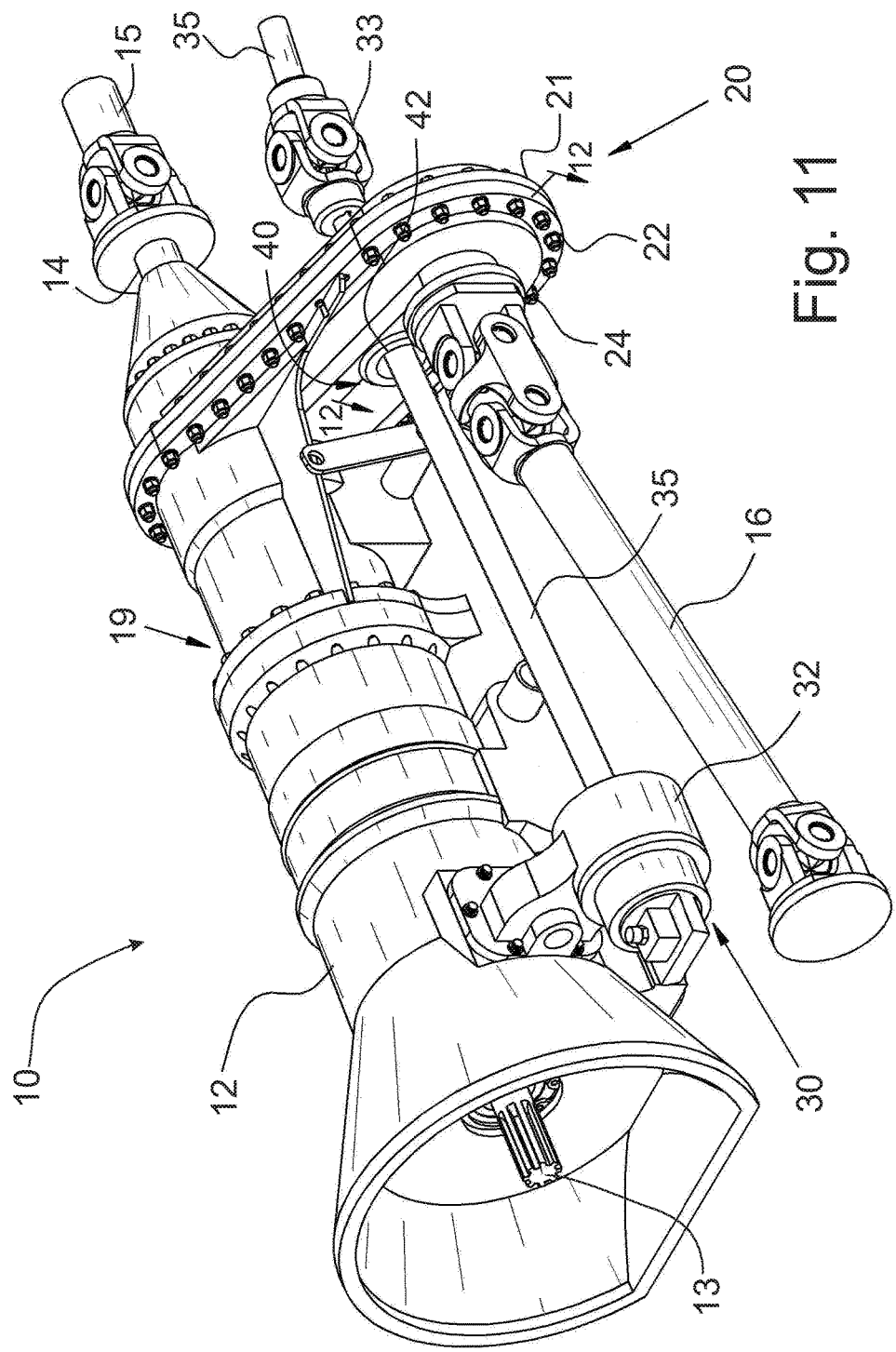
FIG. 11 is a perspective view of yet another embodiment of the transfer case accommodating the passage of the power takeoff shaft according to the principles of the instant invention.
Figure 12:
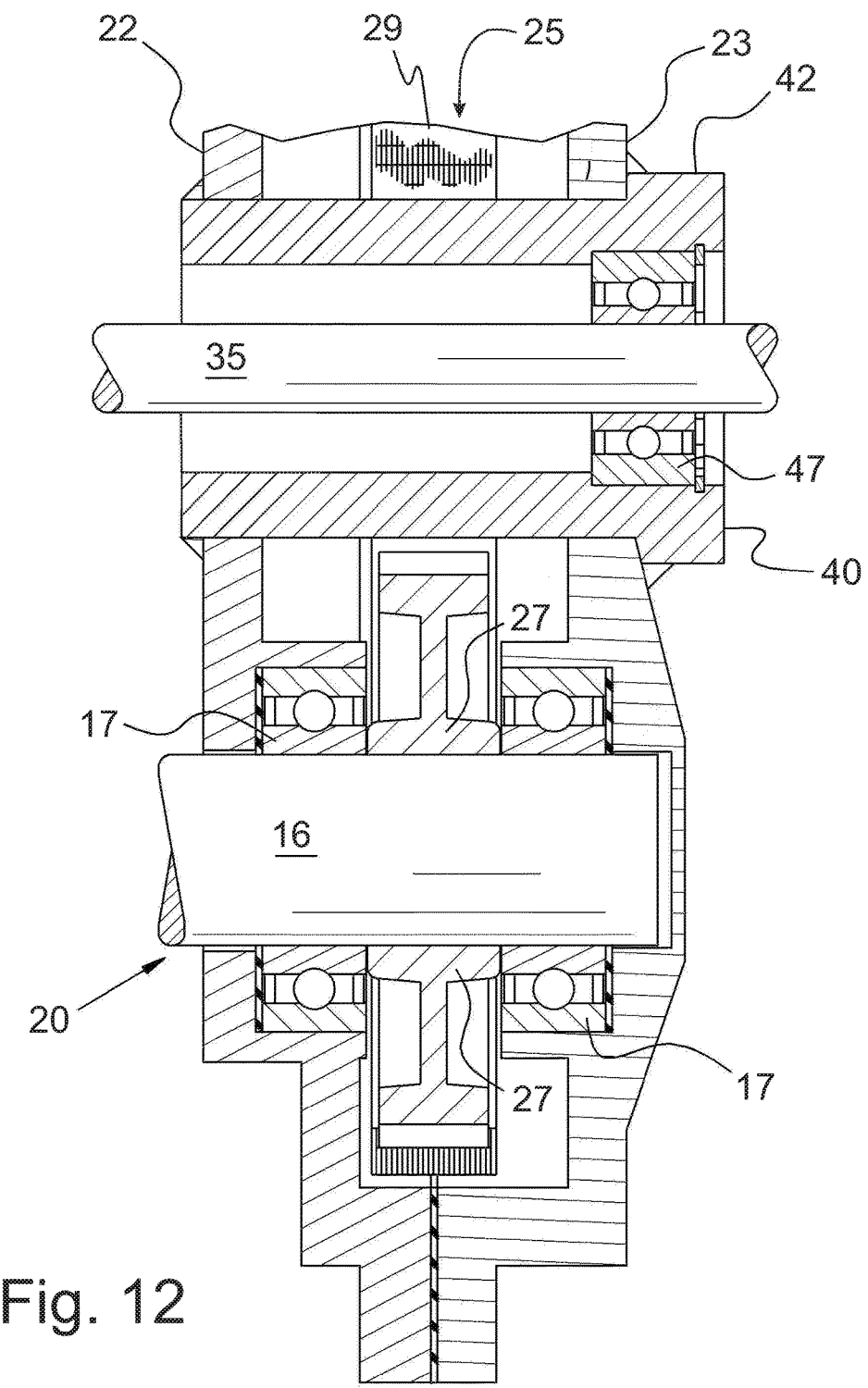
FIG. 12 is a cross-sectional view of a portion of the transfer case taken along lines 12-12 in FIG. 11.

Yet another alternative structural configuration of the power takeoff shaft 35 passing through the transfer case 20 can be seen in FIGS. 11 and 12. In this configuration, the forward portion of the PTO shaft 35 between the drive transfer mechanism 32 and the transfer case 20 is devoid of universal joints. The PTO shaft 35 is supported by the internal bearings (not shown) of the drive transfer mechanism 32 and the single bearing 47 at the rearward side of the receiving tube 40. A universal joint 33 located rearwardly of the transfer case 20 will enable the PTO shaft 35 to bend slightly to accommodate the positioning of the secondary implement or accessory. As with the other embodiments of the PTO mechanism 30 described above, the PTO shaft 35 passes through the transfer case 20 without disrupting the operation of the drive mechanism 25 within the housing 21. The receiving tube 40 will seal the front side 22 of the housing 21, while the receiving tube 40 or the bearing 47 will seal the rear side 23 of the housing 21 to maintain the fluid tight integrity of the transfer case 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a transfer case for a four-wheel drive vehicle operably interconnecting a main drive line and a front axle drive shaft and defining a cavity within said transfer case, said transfer case including a power transfer mechanism housed within said cavity and being operable within said cavity to transfer rotational power from said main drive line to said front axle drive shaft, the improvement comprising:
  a power takeoff shaft rotatably supported within said transfer case between said main drive line and said front axle drive shaft, said power takeoff shaft passing through said cavity without engagement with said power transfer mechanism so as to be operable independently of said power transfer mechanism, said power takeoff shaft including a shaft member extending from opposing sides of said transfer case;
  a bearing assembly rotatably supporting said power takeoff shaft for rotation relative to said transfer case and said power transfer mechanism; said cavity being defined by a front housing member and a rear housing member having said cavity therebetween, each of said front and rear housing members having an opening therein corresponding to said power takeoff shaft; and
  a tubular member extending from said opening in said front housing member to said opening in said rear housing member to create a passageway extending through said cavity, said power takeoff shaft passing through said passageway to extend from both said front housing member and said rear housing member.

2. The transfer case of claim 1 wherein said bearing assembly is mounted in said tubular member to rotatably support said power takeoff shaft within said tubular member.

3. The transfer case of claim 2 wherein a second bearing assembly is mounted in said tubular member, said bearing assemblies being located within said tubular member to correspond to said front and rear housing members.

4. The transfer case of claim 1 wherein said rear housing member has a driven apparatus mounted thereon at said opening therein, said power takeoff shaft being operably connected to said driven apparatus to provide operational power thereto.

5. A drive system for a four-wheel drive vehicle having a powered front axle and a powered rear axle, comprising:
  a primary drive line operably connected to said rear axle to provide rotational power thereto;
  a transfer case operably connected to said primary drive line to provide rotational power to said front axle, said transfer case including a housing defining a fluid tight cavity therein and enclosing therein:
    a drive sprocket mounted on said primary drive line for rotation therewith;
    a driven sprocket mounted on a front axle drive shaft rotatably supported in said housing; and
    a power transfer mechanism interconnecting said drive sprocket and said driven sprocket to transfer rotational power therebetween; and
  a power takeoff mechanism operably connected to said primary drive line and including a rearwardly extending power takeoff shaft, said power takeoff mechanism being selectively operable to provide a secondary source of rotational power, said power takeoff shaft passing through said housing without contacting or engaging said power transfer mechanism.

6. The drive system of claim 5 wherein said housing is formed from a front housing member and a mating rear housing member connected to said front housing member, said front and rear housing members including aligned openings therein for the passage of said power takeoff shaft through said housing.

7. The drive system of claim 6 wherein at least one of said front and rear housing members includes a bearing supported thereon at said opening therein to rotatably support said power takeoff shaft.

8. The drive system of claim 7 wherein power transfer mechanism is an endless chain coupler entrained around said drive and driven sprockets to transfer rotational power to said front axle drive shaft, said power takeoff shaft passing through said housing between said drive and driven sprockets and between upper and lower runs of said chain coupler.

9. The drive system of claim 6 wherein a receiving tube passes through said housing from the opening in said front housing member to the opening in said rear housing member, said power takeoff shaft passing through said receiving tube.

10. The drive system of claim 9 wherein said receiving tube mounts a bearing at each of front and rear opposing ends thereof, said bearings rotatably support said power takeoff shaft.

11. The drive system of claim 10 wherein said receiving tube is sealed to said front and rear housing members to maintain said housing as a fluid tight structure, said receiving tube being fixed to said housing and permitting said power takeoff shaft to pass through said transfer case without engagement with said power transfer mechanism therein.

12. A drive transfer mechanism for receiving and transferring rotational power to a front axle of a four-wheel drive vehicle having a primary drive line, comprising:
  a transfer case extending from said primary drive line at a first end to a front axle drive shaft rotatably supported in and extending forwardly of said transfer case at a second end spaced from said first end, said transfer case including a housing formed by a front housing member connected to a rear housing member to define a fluid tight cavity therebetween;
  a power transfer mechanism housed within the cavity of said transfer case and operably interconnecting said primary drive line and said front axle drive shaft, said power transfer mechanism including a drive sprocket mounted on said primary drive line, a driven sprocket mounted on said front axle drive shaft and an endless chain coupler interconnecting said drive and driven sprockets to transfer rotational power to said front axle drive shaft; and a power takeoff shaft rotatably supported by said housing of said transfer case, said power takeoff shaft passing through said housing, extending forwardly of said front housing member and rearwardly of said rear housing member, without connection to said power transfer mechanism such that said power takeoff shaft is operable independently of said power transfer mechanism without contacting or engaging said power transfer mechanism within said transfer case.

13. The drive transfer mechanism of claim 12 wherein said front housing member has a first opening therein for the passage of said power takeoff shaft through said transfer case, said rear housing member including a second opening positioned in alignment with said first opening for the passage of said power takeoff shaft rearwardly out of said transfer case, each of said front and rear housing members including a bearing supported thereon at the respective said first and second openings for rotatably supporting said power takeoff shaft.

14. The drive transfer mechanism of claim 13 wherein said first and second openings are located to pass said power takeoff shaft through said transfer case horizontally between said drive and driven sprockets and vertically between upper and lower runs of said chain coupler so that said power takeoff shaft does not interfere with the operation of said power transfer mechanism within said cavity.

15. The drive transfer mechanism of claim 12 further comprising a receiving tube inserted into said first opening and extending to said second opening to define a passageway through said transfer case, at least one bearing being mounted in said receiving tube, whereby said power takeoff shaft passes through said passageway without being exposed to said cavity.

16. The drive transfer mechanism of claim 15 wherein said receiving tube is sealed against said front and rear housing members to maintain the fluid tight integrity of said housing.

* * * * *